United States Patent

Hucklesby et al.

[11] 4,081,862
[45] Mar. 28, 1978

[54] MIXING MACHINE

[75] Inventors: John Charles Hucklesby; Raymond Arthur Lilley; Ronald Henry Jackson, all of Peterborough, England

[73] Assignee: Baker Perkins Chemical Machinery Limited, Peterborough, England

[21] Appl. No.: 781,144

[22] Filed: Mar. 25, 1977

Related U.S. Application Data

[63] Continuation-in-part of Ser. No. 624,553, Oct. 21, 1975, abandoned.

[51] Int. Cl.² .............................................. B01F 7/08
[52] U.S. Cl. ..................................... 366/99; 366/185
[58] Field of Search ............... 259/185, 109, 110, 102, 259/9, 10, 45, 46, 105, DIG. 1, DIG. 2

[56] References Cited

U.S. PATENT DOCUMENTS

| 590,782 | 9/1897 | Webber | 259/105 |
|---|---|---|---|
| 1,265,375 | 5/1918 | Pinkney | 259/DIG. 1 |
| 1,801,101 | 4/1931 | Morton | 259/105 |
| 2,099,937 | 11/1937 | Lauterbur | 259/105 |
| 2,589,381 | 3/1952 | Higgins | 259/109 |
| 3,043,571 | 7/1962 | Swarthout | 259/105 |
| 3,061,281 | 10/1962 | Phelan | 259/109 |
| 3,081,804 | 3/1963 | Koch | 259/109 |
| 3,226,097 | 12/1965 | Vayda | 259/103 |

Primary Examiner—Robert W. Jenkins
Attorney, Agent, or Firm—Learman & McCulloch

[57] ABSTRACT

A mixing machine more particularly for pastes, doughs, slurries or the like has a mixing chamber with a central core, a pair of rotary mixing elements, one for sweeping the surface of the core and the other for sweeping the wall of the chamber and a static pin within the chamber between the mixing elements whereby a product is sheared and divided during mixing.

5 Claims, 4 Drawing Figures

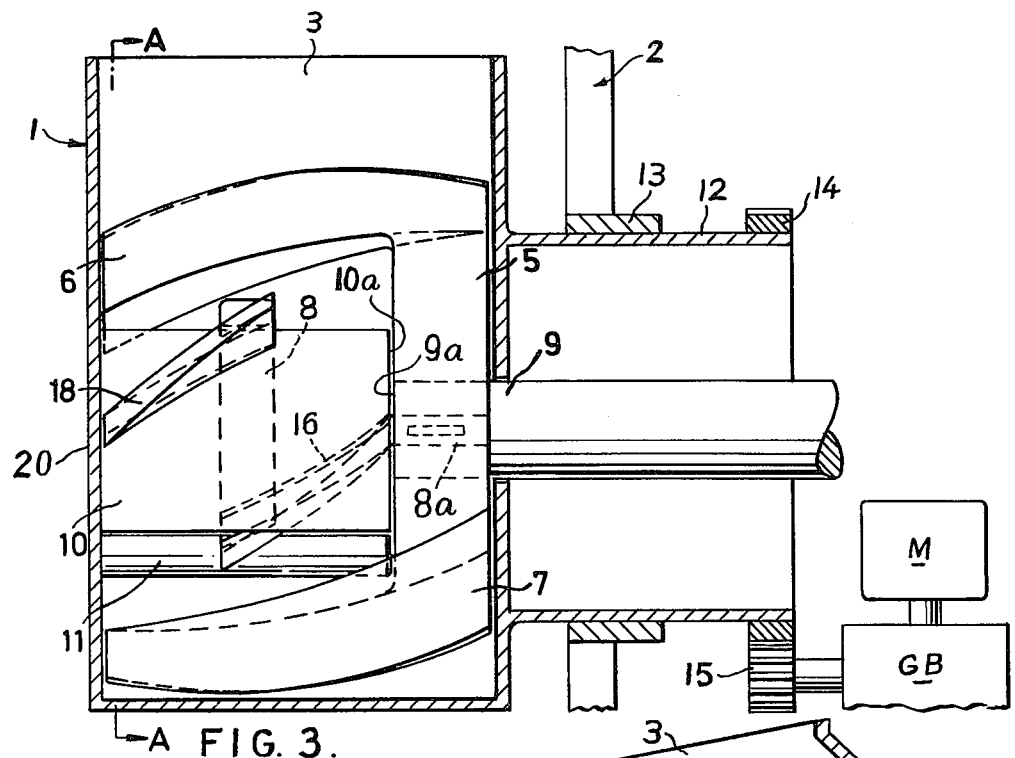
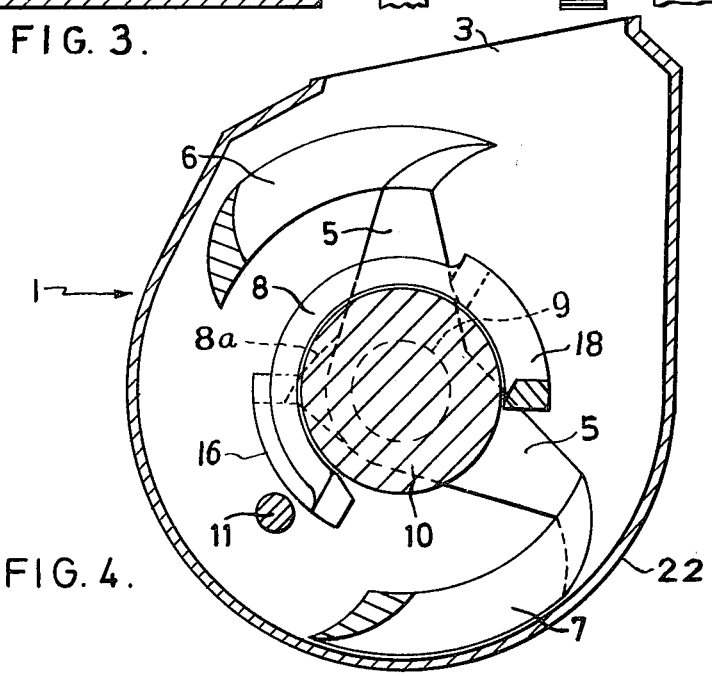

MIXING MACHINE

REFERENCE TO RELATED APPLICATION

This application is a continuation-in-part of our co-pending application Ser. No. 624,533, filed Oct. 21, 1975 now abandoned.,

SUMMARY OF THE INVENTION

This invention relates to a mixing machine more particularly suitable for pastes, doughs, slurries and powders.

According to the invention, a mixing machine comprises within a mixing chamber a central core, a first mixing element at least partially surrounding said core, a second mixing element disposed between said first mixing element and a peripheral wall of the mixing chamber and a pin extending parallel to the axis of the core in a space between the first and second mixing elements.

In use, mixing can be obtained by establishing relative rotation about the axis of the core between any of the following integers namely the first mixing element, the second mixing element, the pin, the core and the wall of the chamber. Rotation is preferably such that the first mixing element sweeps the surface of the core, and the second mixing element sweeps the wall of the chamber with the pin disposed between the elements serving to shear and divide a product being mixed. Conveniently, the core is cylindrical and coaxial with an at least partially cylindrical wall of the mixing chamber, the mixing elements on the one hand and the core and chamber on the other hand being arranged for relative rotation about the common axis of the core and chamber.

Each mixing element may include at least one helically extending member, and preferably comprises a pair of circumferentially spaced opposite-handed helical members, which may be spaced 180° apart. The two mixing elements may then be off-set by 90°.

Conveniently the mixing machine should be of cantilevered construction, the mixing chamber and the mixing elements being supported at one end only.

The mixing chamber may also be provided with an open section, which is uppermost in an operating position, and which is arranged to rotate about the same axis as the mixing elements, for introduction and subsequent discharge of material. A cover may be disposed above the mixing chamber for engagement with the open section to seal the chamber when in the operating position.

Conveniently the mixing chamber should be U-shaped, with the open section flat and inclined at an angle to the horizontal in the operating position, and the cover being correspondingly flat and inclined.

The invention will now be more particularly described by way of example with reference to the accompanying drawings, in which:

FIG. 3 is a detailed cross sectional view of the mixing chamber assembly of the machine of FIG. 1; and FIG. 4 is a cross sectional view taken on the line A—A of FIG. 3.

Figure 2:
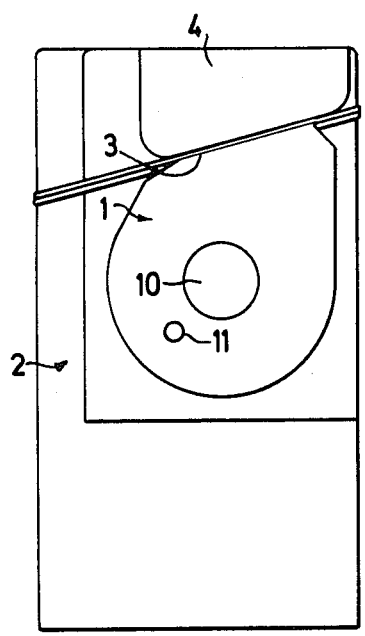
FIG. 2 is an end view of the machine of FIG. 1.

Mixing apparatus embodying the present invention includes a generally U-shaped mixing chamber assembly designated generally 1 having an integral axially extending collar 12 (FIG. 3) which pivotally supports the chamber assembly 1 at one end of a main housing designated generally 2. The upper end of the U-shaped chamber is open at 3, the edges of this opening being inclined as best seen in FIGS. 2 and 4 so that when the chamber is in the operative position shown in FIG. 2, the opening 3 is closed by an overlying cover portion 4 mounted upon and projecting from main housing 2.

Referring to FIG. 3, it is seen that the collar 12 is rotatably received within a bearing 13 mounted in the wall of housing 2. Collar 12 carries a fixedly mounted ring gear 14 which is meshed with a pinion gear 15 mechanically interconnected via a gear box GB to a reversible drive motor M. Motor M is operated, by conventional controls, to rotate the chamber assembly 1 between the normal operative position shown in FIG. 2 and an opened position displaced in a closkwise direction from the full line position of FIG. 2, in which opening 3 is retracted from cover 4 to accommodate the discharge or introduction of materials from or to the interior of the chamber.

Figure 1:
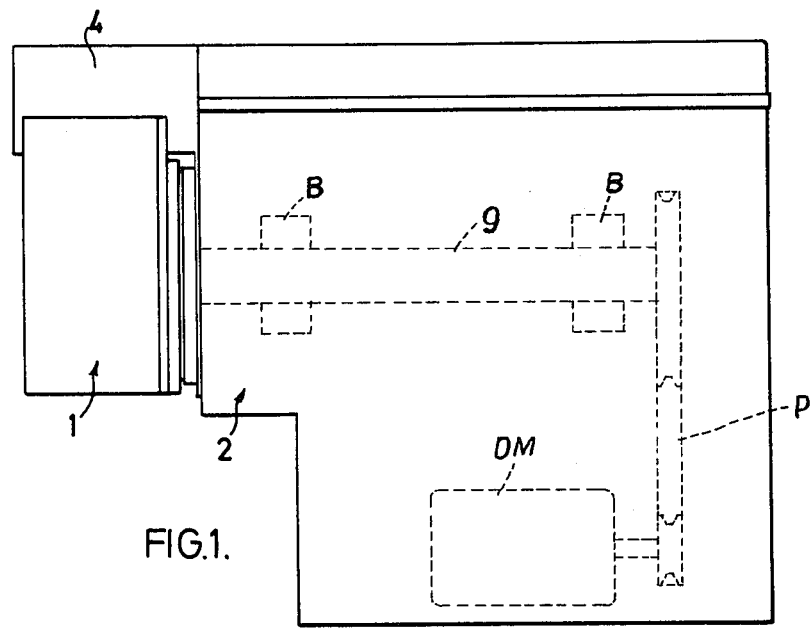
FIG. 1 is a side view of a mixing machine embodying the present invention.

A shaft 9 is rotatably supported within housing 2 as by bearings B (FIG. 1) and is driven by a drive motor DM through a belt and pulley arrangement designated P.

Referring now to FIG. 3, it is seen that drive shaft 9 projects coaxially freely through collor 12 and terminates within the mixing chamber at a distal end 9a. Within the mixing chamber an outer mixing element includes a pair of helically extending blades 6 and 7 which are cantilevered from shaft 9 as by generally radially extending arms 5 fixedly secured to shaft 9. As best seen in FIG. 4, the blades 6 and 7 are offset 180° from each other and are pitched in opposite directions.

An inner mixing element includes a pair of helical blades 16 and 18 of opposite helical pitch interconnected to other at positions spaced approximately 180° apart by a generally semicircular half-ring portion 8. Blade 16 if fixedly secured to shaft 9 by a generally radially extending mounting 8a so that the inner mixing element constituted by blades 16 and 18 and their interconnecting half-ring 8 is cantilevered from shaft 9. Blades 16 and 18 are rotatively offset 90° from blades 6 and 7.

The radially inner surfaces of blade 16, half-ring 8 and blade 18 are shaped to sweep the surface of a cylindrical core member 10 which is fixedly mounted at one end upon the outer wall 20 (FIG. 3) of chamber assembly 1 to project substantially across the interior of the chamber in coaxial relationship to shaft 9. As best seen in FIG. 3, the inner end 10a of core 10 is axially spaced slightly from the inner end of shaft 9.

In addition to core 10, a stationary or static pin 11 is fixedly mounted at one end on wall 20 of the chamber assembly and projects, in spaced parallel relationship with core 10 into the chamber. As best seen in FIG. 4, static pin 11 is located to project between the paths of blades 6 and 7 of the outer mixing element and blades 16 and 18 of the inner mixing element.

The arrangement described above provides an extremely efficient mixing action to material within the chamber upon the driving of shaft 9 in rotation to cause the mixing elements to rotate through a mixture of material contained within the chamber. Core 10, which is coaxially aligned with shaft 9, functions to fill that portion of the chamber lying adjacent the axis of rotation of the mixing elements. In the absence of core 10, the space occupied by core 10 would otherwise be filled with material being mixed. Because the material being mixed is subjected in general to a rotating action induced by the rotating mixing elements, material which is located adjacent the axis of rotation of the mixing elements is moved at a very low velocity as compared to material within the chamber which is located at a substantial radial distance from the axis of rotation of the mixing elements. Thus, this material located near the axis of rotation is subjected to very little mixing action. It will tend to form a centrally located cylindrical mass which rotates as a unit without any mixing action.

Where the core 10 occupies the region adjacent the axis of rotation, all material within the mixing chamber is located as a fairly substantial radial distance from the axis of rotation and thus is impelled with a resoanably high velocity by the rotating mixing elements.

The inner mixing elements constituted by blades 16 and 18 is so located to sweep the surface of core 10 as the mixing elements are rotated to impart a mixing motion to material which normally tends to cling to the peripheral surface of core 10. Static pin 11, located slightly radially outwardly of the path followed by blades 16 and 18 of the inner mixing element, further augments the mixing action as the material being mixed is impelled against the stationary pin 11 by the moving mixing blades. Blades 6 and 7 of the outer mixing elements are arranged to sweep the surface of the inner wall of the chamber which, as best seen in FIG. 4, is so shaped that the peripheral wall 22 of the chamber has a portion of cylindrical configuration coaxial with shaft 9 which extends through an arc of 180° or more about the axis of shaft 9. The opposite ended pitch of the helical blades imparts an axial component of movement to the material being mixed to further increase the mixing action. While only one static pin 11 has been shown, it is believed apparent that additional pins 11 might be provided as required.

By cantilevering the mixing blades from one side of the chamber and by cantilevering the stationary core and static pin 11 from the opposite side of the chamber so that stationary and rotating elements axially overlap each other over substantially the entire chamber an optimum mixing is achieved, while at the same time resulting in a design which permits simple disassembly of the mechanism for cleaning or repair. The relationship between the stationary and rotating parts achieves an optimum shearing and dividing of the material being mixed.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. A mixing machine comprising means defining a chamber of generally U-shaped cross section having an internal surface, a portion of which internal surface is in the form of a portion of a cylinder, a stationary cylindrical central core projecting coaxially into said chamber from one end thereof in coaxial relationship with the cylindrical wall portion of said chamber to a location adjacent the opposite end of said chamber, a rotatable drive shaft mounted at the opposite end of said chamber for rotation in closely spaced coaxial relationship with said core, a first generally helical mixing element mounted at one end upon said shaft for rotation therewith and extending axially from said shaft to a location adjacent said one end of said chamber, said first mixing member closely surrounding said core and being adapted to sweep the surrounding of said core upon rotation of said drive shaft, a second mixing element mounted at one end upon said shaft for rotation therewith and extending axially from said shaft to a location adjacent said one end of said chamber, said second mixing element being adapted to sweep the cylindrical wall portion of said chamber upon rotation of said drive shaft, and a stationary pin extending axially into said chamber from said one end thereof at a locaton between the respective paths of rotary travel of said first and said second mixing elements.

2. A mixing machine as defined in claim 1 wherein said mixing elements each include at least two helical blades of opposite helical pitch.

3. A mixing machine as defined in claim 2 wherein said blades are cantilevered from said shaft at a location adjacent said opposite end of said chamber to a location closely adjacent said one end of said chamber and said core and said pins are cantilevered from said one end of said chamber to substantially entirely axially overlap said blades.

4. A mixing machine as defined in claim 1 further comprising a housing, a hollow cylindrical collar on said means defining a chamber coaxial with said cylindrical wall portion of said chamber and projecting from said opposite end of said chamber and rotatably received within said housing, said shaft being supported for rotation within said housing and projecting from said housing through said collar into said chamber, and drive means in said housing for rotating said chamber relative to said housing.

5. A mixing machine as defined in claim 4 including an opening in said chamber opposite said cylindrical wall portion, said drive means being operable to rotate said chamber between an operative position wherein said opening faces upwardly and a material receiving-/discharge position rotatively offset from said operative position, and a cover member projecting from said housing to overlie said opening when said chamber is in said operative position.

* * * * *

UNITED STATES PATENT AND TRADEMARK OFFICE
CERTIFICATE OF CORRECTION

PATENT NO. : 4,081,862
DATED : March 28, 1978
INVENTOR(S) : John Charles Hucklesby et al It is certified that error appears in the above-identified patent and that said Letters Patent are hereby corrected as shown below:

column 1, line 7, change "624,533" to --624,553-- column 2, line 26, change "collor" to --collar-- column 2, line 36, after "to" insert -- each -- column 2, line 38, change "if" to --as-- column 3, line 13, change "as" to --at-- column 4, line 16, change "surrounding" to --surface--

Signed and Sealed this

Twenty-second Day of August 1978

[SEAL]

Attest:

RUTH C. MASON
Attesting Officer

DONALD W. BANNER
Commissioner of Patents and Trademarks